United States Patent [19]

Bilow

[11] 3,855,273

[45] Dec. 17, 1974

[54] POLYAMIC ACIDS AND ESTERS

[75] Inventor: Norman Bilow, Los Angeles, Calif.

[73] Assignee: Hughes Aircraft Company, Culver City, Calif.

[22] Filed: Sept. 5, 1972

[21] Appl. No.: 275,676

Related U.S. Application Data

[63] Continuation-in-part of Ser. No. 211,431, Dec. 23, 1971, abandoned.

[52] U.S. Cl. .............. 260/471 R, 161/214, 260/519

[51] Int. Cl. .......................................... C07c 103/30

[58] Field of Search ......................... 260/471 R, 519

[56] References Cited

UNITED STATES PATENTS 3,726,831 4/1973 Acle et al. ...................... 260/471 R

*Primary Examiner*—Lorraine A. Weinberger
*Assistant Examiner*—L. A. Thaxton
*Attorney, Agent, or Firm*—W. H. MacAllister; J. A. Sarjeant

[57] ABSTRACT

This invention is concerned with an improved polyimide which makes an excellent electrical insulation for metal conductors. It may be used as the insulating layer around the periphery of the metal conductor or as an adhesive for tape used as the insulating layer. The invention is also concerned with a novel prepolymer which is essentially a polyamide in structure and which is readily curable to the corresponding polyimide. The prepolymer is prepared by reacting a tetraalkyl ester of benzophenone tetracarboxylic acid or its anhydride with 1,3-bis(p-aminophenoxy)benzene.

8 Claims, 2 Drawing Figures

PATENTED DEC 17 1974

3,855,273

POLYAMIC ACIDS AND ESTERS

RELATED APPLICATIONS

This is a continuation-in-part of my co-pending application Ser. No. 211,431 filed Dec. 23, 1971 now abandoned.

BACKGROUND OF THE INVENTION

The use of polyimides as insulating layers for metallic conductors has received extensive attention, particularly, for those uses where the insulating layer will be exposed to high temperatures, e.g., 600°F. In addition, there has been considerable effort expended in developing polyimide precursors which may be directly coated on metallic conductors and then cured to form a protective insulating layer or which may be used as adhesives for bonding insulating layers together on metal conductors, particularly where the insulating layer is a polyimide tape.

Typical polyimides now in production are illustrated as follows:

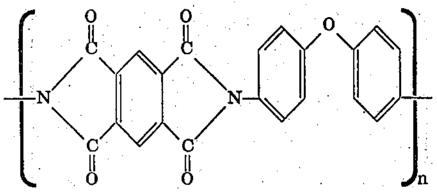

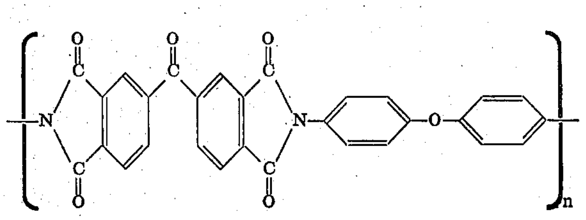

These are used to form insulation tape.

Other improved polyimide and pyrrone materials, including precursors thereof, are disclosed in co-pending applications Ser. No. 851,462, filed Aug. 19, 1969; Ser. No. 856,237, filed Aug. 8, 1969; Ser. No. 113,816, filed Feb. 9, 1971; Ser. No. 113,927, filed Feb. 9, 1971; and Ser. No. 159,025, filed July 1, 1971 each, now abandoned. Other related art in this field includes U.S. Pat. No. 3,349,061 and U.S. Pat. No. 3,567,684.

BRIEF SUMMARY OF THE INVENTION

Figure 1:
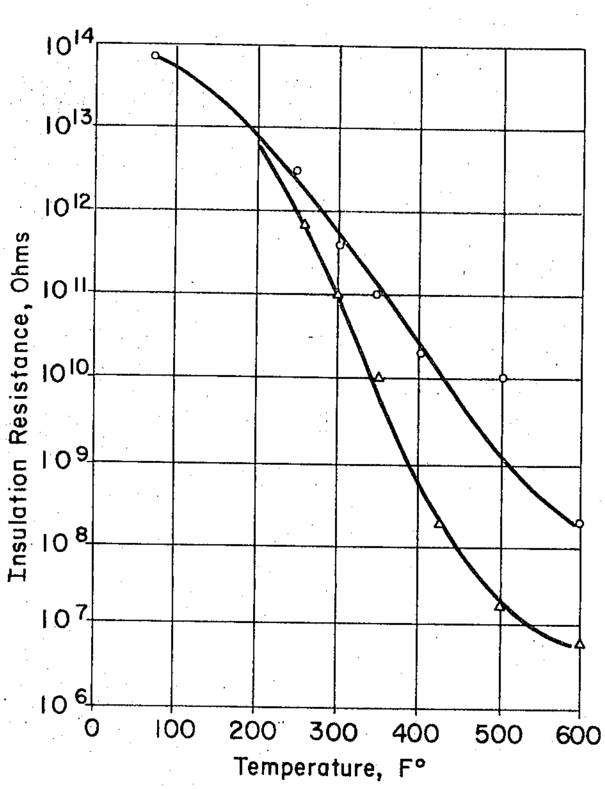
FIG. 1 is a graph comparing the resistance of the insulation provided an electrical wire by a polyimide tape having a 3 mil overcoat of the polyimide of this invention as compared with the same insulated wire without the overcoat.

The present invention provides novel polyamides which can be used to form insulating coatings for electrical conductors. They are also useful as adhesives or overcoatings, particularly for insulating tapes made from heterocyclic polymers. The novel polyamides consist essentially of the following recurring unit:

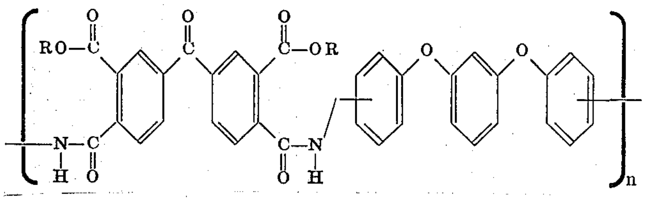

wherein $n$ is from 1 to about 10, preferably 1 to 5, and R is H or preferably alkyl having from one to about five carbon atoms.

The invention is also concerned with improved insulated metal conductors having a layer, about the periphery of said conductor, of a polyimide consisting essentially of the following recurring unit:

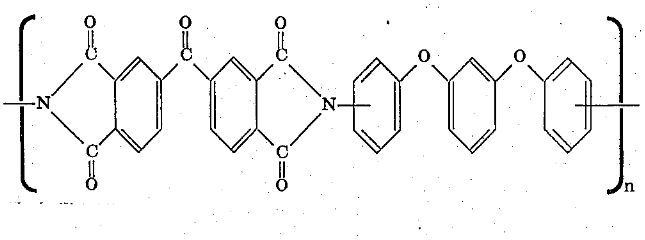

The polyimide is produced by curing a polyamide of formula I.

The polyimide product of this invention is unique as a coating in the polyimide art in that it absorbs significantly less water than conventional polyimides and provides a more flexible wire coating or overcoating for metallic conductors.

GENERAL DESCRIPTION

The polyimide precursors (polyamides) of the present invention are prepared by condensing substantially equimolecular quantities of a tetraalkyl ester of benzophenone tetracarboxylic acid or the corresponding anhydride with 1,3-bis(p-aminophenoxy) benzene or 1,3-bis(m-aminophenoxy)benzene to form what is basically a polyamide structure. If excess diamine is used, the polymer will not imidize completely and thus will not convert completely to its most heat resistant form. If excess ester or anhydride is used, the polymer molecular weight will be depressed and poorer physical properties could result. The reaction may be carried out in a solvent or by melting the two reactants and maintaining them in a molten condition for a suitable period of time. When the tetra ester is employed, the degree of reaction can be measured by trapping alcohol which is distilled out of the reaction zone and measuring the volume of the evolved entrapped alcohol. A product produced by the interreaction of 1 mole of the tetra ester and 1 mole of the diamino compound and condensed to a point where only one-third of the alcohol is liberated which theoretically can be formed from the four ester groups, will correspond to formula I in which $n$ is between 1 and 2. When $n$ is 1 in formula I, there will be three ester groups on the benzophenone radical, one amino group on the terminal benzene radical and one —CONH— bridge linking the benzophenone radical with the phenyl ether moiety. At lower temperatures and/or in the presence of a solution, the reaction tends to be linear involving one of the vicinal ester groups with a primary amino group. The reaction is controlled so that the resultant product produced from the tetraethyl ester will have an average molecular weight from approximately 716, when $n$ is equal to 1, to approximately 6,746, when $n$ is equal to 10.

When the reaction involves the benzophenone dianhydride, it does not produce alcohol. Instead, the dianhydride structure is split to form a —CONH— bridge between the benzophenone radical and the phenyl ether moiety and the vicinal keto radial is converted to —COOH. The molecular weights of the products will also vary slightly from those produced from the tetra ester because the —COOH group is lighter than any of the corresponding ester groups, and the terminal dianhydride structure is lighter than the terminal diester groups. Since an alcohol is not produced from the dianhydride reaction, an additional method for measuring the degree of reaction is needed. A commonly used method involves measuring the inherent viscosity of the resultant product. This is determined by dissolving 2.4 grams of the polyamide product in 100 cc of dimethylformamide and measuring the viscosity of the solution at 25°C. Desirable products are obtained when the inherent viscosity ranges from approximately 0.042 to approximately 0.08. This test is equally applicable to the products obtained from the reaction involving the tetra ester moiety.

Those skilled in the art can readily determine the reaction conditions necessary to achieve a product with a certain inherent viscosity. With the benefit of a minimum number of trail runs in light of the specific examples contained herein, one can quickly establish the temperature and time of reaction needed with any given benzophenone reaction to obtain repeatedly the desired viscosity.

Recovery of the polyamide from the reaction vessel will vary slightly depending upon the mode of reaction. For example, when the product is prepared from a melt of the two reactants, it will solidify on cooling. As a result, it may be poured into a suitable container while still in the molten condition or allowed to cool in the reaction vessel to form a solid of substantially pure polyamide product. If the reaction has been carried out in the presence of a solvent, the reaction mixture may be diluted with a liquid in which the solvents remain soluble but in which the reaction product is insoluble, thus forcing the reaction product to precipitate out of solution. Useful liquids for this purpose include methanol, ethanol, possibly dioxane and propanol. In the alternative, the reaction solvent may be removed under vacuum at temperatures up to about 100°C. Higher temperatures should be avoided to prevent premature formation of polyimides.

It is not always necessary to remove the solvent, or even to allow the reaction product to solidify. In the case of appropriate reaction solvents, the resultant solution after reaction may be a useful varnish. The varnish can be coated on wire directly, particularly if the varnish is sufficiently viscous to form a layer of desirable thickness on the wire. If greater viscosity is desired, some of the reaction solvent can be removed under vacuum. The molten product produced by the melt reaction may also be used in the same manner provided care is taken to avoid premature polyimide formation. Multiple coatings may be used on the wire itself or on a tape-wrapped wire to build up the thickness of the coat. I have found that is is generally advisable to allow the reaction product to dry between coatings.

When the polyamide is used as an adhesive, it can be brushed on or the tape may be dipped into the solution or melt. The coated tape then is wrapped around the periphery of the metallic conductor, and subjected to a B-stage curing step, preferably at a temperature from about 175°C to about 250°C for a period from about 1 hour to about 6 hours. Temperatures about 50°C lower may be used if the anhydride is used in place of the tetraester. At this temperature the polyamide will flow and form a coherent adhesive between the tape and the wire. Particularly useful adhesives are obtained when the reaction product is produced from the tetra ester benzophenones and especially the tetraethyl compound; these products allow the tape to bond to itself in an overlapped state in a surprisingly void free manner.

The following examples are set forth as illustrative of my inventions.

EXAMPLE I

Benzophenonetetracarboxylic acid dianhydride (8.24 grams, 0.0255 mole) dissolved in 38 ml of N-methyl-2-pyrrolidone was placed in a three necked 300 ml flask fitted with a stirrer, a condenser protected from the atmosphere with a dessicant-filled tube, thermometer and heating mantle. To the flask was added a solution of 1,3-bis(4-aminophenoxy)benzene (10.0 grams, 0.0342 mole) in 38 ml of N,N dimethylacetamide. The solution was kept at 55°C for 16 hours. The total weight of the lacquer was 89 grams. It contained the equivalent of 20 percent solids content.

The lacquer was poured into a large excess of methanol, approximately 500 ml, causing the polyamide product to precipitate from solution. The precipitate then was separated by filtration on a Buchner funnel, washed with an additional 100–200 ml of methanol and allowed to dry at room temperature.

EXAMPLE II

Example I was repeated except that the polyamide was not precipitated from the lacquer. The lacquer was applied directly to a wire by drawing the wire through the lacquer a plurality of times until the desired coating thickness had been achieved. The wire was allowed to dry each time that it was drawn through the lacquer and the finally coated wire was postcured at 300°C for approximately 4 hours.

Ten grams of the solidified product of Example I may be dissolved in 50 ml of chloroform, to form a lacquer having 20% solids. The solidified product will dissolve readily if it is first pulverized. This lacquer can be used in the manner set forth in this example with equivalent results.

EXAMPLE III 0.10 moles of tetraethyl benzophenone tetracarboxylate and 0.10 moles of 1,3-di(4-aminophenoxy)benzene were dissolved in 100 cc dioxane. The solution was placed in a three-necked, 500 ml flask which was fitted with a stirrer, a condenser protected from the atmosphere, a thermometer and a heating mantle. The solution temperature was raised to 75°C and maintained at that temperature for 10 hours. During the reaction 8 ml of ethyl alcohol was collected in the trap. The reaction solution was poured into 750 ml of ethanol to precipitate the polyamide, which was separated by filtration, washed and dried. The dried product was pulverized and then dissolved in chloroform to provide a lacquer having 25 percent solids. This lacquer can be used in the same manner as the lacquer in Example II to coat a wire directly or to coat a polyimide tape which was then used as an insulating layer around the periphery of a conductor wire. In either event, the product is dried in warm air for 2–4 hours, then cured in argon at 6 hours at 288°C.

EXAMPLE IV

Pieces of a conventional polyimide film (½ × 1 inch) were coated with the varnish prepared in Example II, warm air dried for 2 hours and then cured in argon for 6 hours at 288°C (550°F). The film samples, along with two controls, were vacuum dried for 16 hours at 65°C, then cooled to room temperature in vacuum and weighed. Next, they were immersed in water overnight, wiped dry and reweighed. They were then redried in vacuum at 65°C. Samples coated with the varnish of Example II picked up 2.6 percent water, which was lost in total when redried. In contrast, the uncoated, conventional polyimide picked up 4.3 percent water, which was lost again upon redrying. The coated film thus showed a significantly lower affinity for water.

EXAMPLE V

Conventional polyimide tapes (½ × 12 × 0.003 inch) were brush-coated on one side with the varnish of Example II and after simple air drying, two-ply laminates were prepared and press-cured under the following conditions:

343°C (650°F), 150 psi — 15 minutes
343°C (650°F), 150 psi — 1 hour

These samples showed only marginal adhesion; thus, other samples were dried under more stringent conditions, namely, at 149°C for 30 minutes, 149°C for 45 minutes and 149°C for 60 minutes. These samples subsequently were cured at 16 psi at 200°C, 300°C and 400°C. Although no adhesion was observed on samples cured at 200°C, adhesion was observed on those cured at 300°C to 400°C.

Quantitative bond strength measurements thus were warranted and consequently sheets of sodium etched conventional polyimide film (3 × 6 inches) were brush-coated with the prepolymer varnish of Example II.

These sheets were dried at 65°C (140°F) in air, then in vacuum at 100°C for 16 hours, then they were bonded together at 232°C and 100 psi for 2 hours. They were post-cured overnight at 260°C. A 1 × 6 inch strip was cut from the laminate and the remaining 2 × 6 inch portion was post-cured again, this time for 16 hours at 288°C. The 2 × 6 inch strip was cut in half and one portion was post-cured a third time at 316°C for 16 hours. Peel tests subsequently were made at 288°C and in all cases the substrate failed rather than the adhesive. This demonstrated its excellent adhesive properties in laminate form.

EXAMPLE VI

Experiments were also conducted to demonstrate the use of the polymer as an overcoat for composite wrapped insulation. A wire A was prepared by wrapping it with a conventional 1 mil thick polyimide film known as Kapton previously coated with an adhesive prepared from the tetraethyl ester of benzonephenonetetracarboxylic acid and 3,3',4,4'-tetraaminobenzophenone as shown in my copending application, Ser. No. 856,237, filed Aug. 18, 1969. A second wire B was prepared using the same Kapton film and a commercially available polyimide adhesive.

Figure 2:
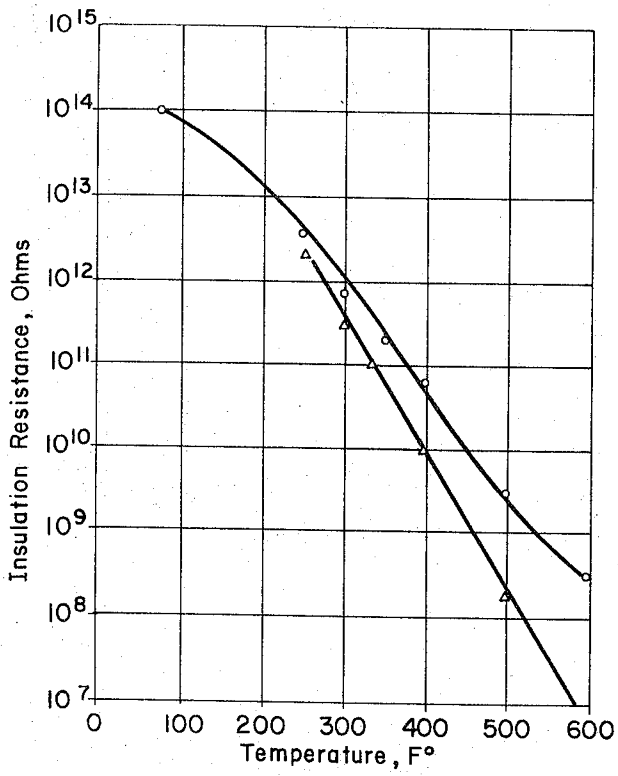
FIG. 2 is a modification of FIG. 1 in which the overcoat is 2 mils thick.

Overcoats of the polyamide of the present invention was applied by repeated brushings of a 20 percent by weight solution thereof in a mixture of chloroform and tetrahydroturan, air drying for 4 hours between coats, then oven drying for 16 hours at 60°C, followed by 4 hours at 200°C and 4 hours at 290°C. Insulation wall thicknesses were built up to the point where there was 3 mils of insulation on A and 2 miles insulation on B. The results of insulation resistance measurements are shown in the table below. In addition, ambient temperature tests were conducted in anionic wetted water and elevated tests in a molten Bi-Sn alloy bath. Graphs of these data are shown in FIGS. 1 and 2 where $\theta$ represents the resistance of the base wire without the overcoat of the present invention.

Insulation Resistance versus Temperature of Insulated Wire Overcoated with Bis(p-aminophenoxy)benzene Based Polyimide made as in Example II

| Temperature °F | °C | Uncoated Wire A | 3 Mil Overcoat on Wire A | Uncoated Wire B | 2.0 Mil Overcoat on Wire B |
|---|---|---|---|---|---|
| | | Insulation Resistance-30 inch Wires, Ohms | | | |
| 75 | 24 | | $7 \times 10^{13}$ | | $1 \times 10^{14}$ |
| 250 | 121 | $7 \times 10^{11}$ | $3 \times 10^{12}$ | $3 \times 10^{12}$ | $4 \times 10^{12}$ |
| 300 | 149 | $1 \times 10^{11}$ | $4 \times 10^{11}$ | $3 \times 10^{11}$ | $7 \times 10^{11}$ |
| 350 | 177 | $1 \times 10^{10}$ | $1 \times 10^{11}$ | $5 \times 10^{10}$ | $2 \times 10^{11}$ |
| 400 | 204 | $6 \times 10^{8}$ | $2 \times 10^{10}$ | $1 \times 10^{10}$ | $6 \times 10^{10}$ |
| 500 | 260 | $2 \times 10^{7}$ | $1 \times 10^{10}$ | $2 \times 10^{8}$ | $3 \times 10^{10}$ |
| 600 | 316 | $5 \times 10^{6}$ | $2 \times 10^{8}$ | $1 \times 10^{7}$ | $4 \times 10^{8}$ |

What is claimed is:

1. A polyimide precursor consisting essentially of the following recurring unit:

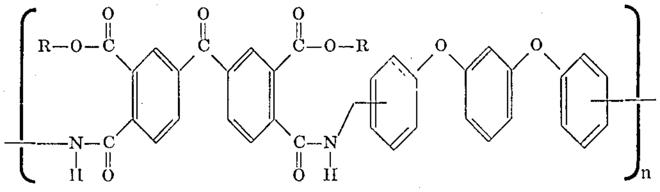

wherein *n* is from 1 to about 10, and R is H or alkyl having from 1 to about 5 carbon atoms.

2. A novel precursor of claim 1 wherein *n* is an average number from about 1 to about 5.

3. A novel precursor of claim 2 wherein R is H.

4. A novel precursor of claim 2 wherein R is ethyl.

5. A novel precursor of claim 2 wherein the phenyl ether moiety is

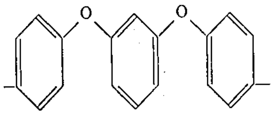

6. A novel precursor of claim 2 wherein the phenyl ether moiety is

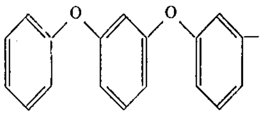

7. A novel precursor of claim 5 wherein R is ethyl and *n* is an average number from 1 to about 5.

8. A novel precursor of claim 6 wherein R is ethyl and *n* is an average number from 1 to about 5.

* * * * *

UNITED STATES PATENT OFFICE

CERTIFICATE OF CORRECTION

Patent No. 3,855,273 Dated December 17, 1974

Inventor(s) Norman Bilow

It is certified that error appears in the above-identified patent and that said Letters Patent are hereby corrected as shown below:

In the Specification

Column 1, line 13, the comma should be deleted after "particularly".

Column 3, line 49, "radial" should be "radical".

line 60, "2.4" should be "2.5".

Column 5, line 1, the printing at the end of the line is faint. The final term of the line should read "(10.0".

line 2, the printing at the end of the line is faint. The final term of the line should read "N,N-".

line 3, the printing at the end of the line is faint. The final word of the line should read "for".

line 27, "in the manner set forth in this example" should read "in the manner set forth above in this example".

Column 6, line 52, "was" should be "were".

line 59, "miles" should be mils".

Column 7, In the Table, the symbol "θ" should appear over both "Uncoated Wire A" and "Uncoated Wire B".

In the Claims

Claim 6, In the Formula, the left benzene ring should have a bond as indicated below.

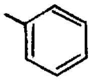

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*